United States Patent
Hong

(10) Patent No.: US 6,278,253 B1
(45) Date of Patent: Aug. 21, 2001

(54) METHOD FOR CONTROLLING SPEED OF MOTOR FOR DRIVING ROBOT

(75) Inventor: Yong Joon Hong, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/366,348

(22) Filed: Aug. 2, 1999

(30) Foreign Application Priority Data

Jun. 25, 1999 (KR) .................................................. 99-24365

(51) Int. Cl.$^7$ ...................................................... B25G 9/22
(52) U.S. Cl. ...................................... 318/568.13; 318/569
(58) Field of Search ........................ 318/568.11–568.24, 318/569; 364/474.28, 474.29, 474.31, 474.32; 901/14, 20, 9, 10

(56) References Cited

U.S. PATENT DOCUMENTS

| | | |
|---|---|---|
| 4,529,921 | 7/1985 | Moribe . |
| 4,912,753 | 3/1990 | Evans, Jr. . |
| 5,373,439 | 12/1994 | Jeon . |
| 5,684,374 * | 11/1997 | Chaffee ............................ 318/474.28 |
| 5,804,941 * | 9/1998 | Ray ........................................ 318/569 |
| 5,892,345 * | 4/1999 | Olsen ............................. 364/474.28 |

* cited by examiner

*Primary Examiner*—Khanh Dang
(74) *Attorney, Agent, or Firm*—Larson & Taylor, PLC

(57) ABSTRACT

A motor speed controlling method is provided in a motor speed controlling apparatus including a motor for driving the robot, a position controller for controlling position of a motor and a main controller for producing a speed command profile of a smooth curve to control the motor based on a robot operational command input by a user and transmit the produced speed command profile to the position controller. The motor speed controlling method includes a step of producing a speed command profile having an acceleration profile of a smooth curve within a predetermined robot control interval so that a robot can be controlled on a real-time basis. Accordingly, vibration and noise of the motor are reduced and thus a control reliability is enhanced.

6 Claims, 7 Drawing Sheets

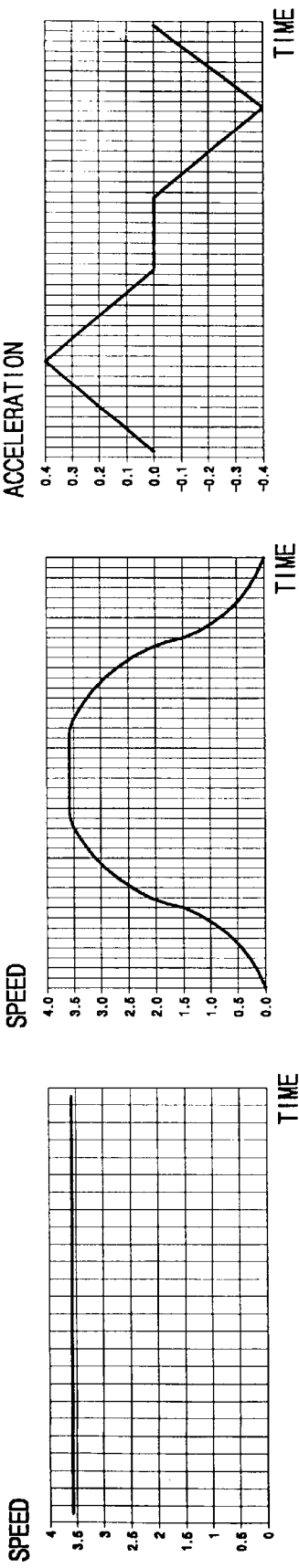
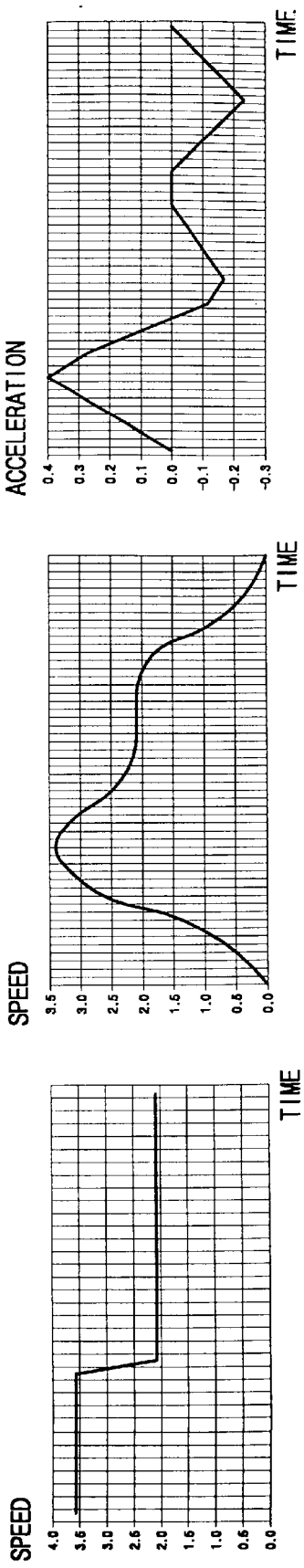

SPEED vs TIME

ACCELERATION vs TIME

METHOD FOR CONTROLLING SPEED OF MOTOR FOR DRIVING ROBOT

BACKGROUND OF THE INVENTION

1. Field of the Invention

The present invention relates to a motor speed controlling method, and more particularly, to a method for controlling speed of a motor for driving an industrial robot.

2. Description of the Related Art

In general, an industrial robot includes mechanical parts for moving a target object on a three-dimensional space or performing a requested job. The robot includes a body which is a central portion for supporting a robot, a manipulator having an arm for moving an end effector into which a tool necessary for a requested job is fitted, to a particular position in a working area, a controller for controlling the manipulator, and a power source for supplying an electric power to the body, the manipulator and the controller. A servo motor is mounted in the arm of the manipulator and the controller controls the servo motor to perform an allocated job.

Generally, a controller includes a main controller, a position controller and a servo driver for driving a servo motor. The main controller produces a speed command profile based on a current position and a user operation command such as a target position input by a user and transfers the produced speed command profile to the position controller. The position controller controls the servo driver based on the received speed command profile and drives the servo motor to move an arm from a certain point to another point. Meanwhile, the position controller receives a current position from an encoder mounted in the servo motor and feedback-controls the position of the arm.

FIGS. 1a and 1a' show user command paths according to the conventional art. FIGS. 1b and 1b' show speed command profiles with respect to FIGS. 1a and 1a', respectively according to the conventional art. FIGS. 1c and 1c' show acceleration paths with respect to FIGS. 1a and 1a', respectively, according to the conventional art.

In a conventional robot, the main controller produces a path plan such as a speed trace in which a final target value is planned according to a movement command from a user as shown in FIGS. 1a and 1a'. Then, the main controller produces a trajectory plan profile such as a speed command profile in which an actual acceleration and deceleration is performed based on the path plan as shown in FIGS. 1b and 1b'.

In other words, according to the conventional robot, the main controller produces a path plan to control a servo motor which drives a manipulator, and then produces a trajectory plan profile based on the path plan. As a result, a response to a user command is not fast. Further, even though a trajectory plan profile is given as a continuous value of a smooth curve, a number of points where a differentiation is impossible exist in a jerk such as an acceleration profile as shown in FIGS. 1c and 1c'. Since an acceleration change rate is sharp in the vicinity of the differentiation-impossible points, vibration and noise are generated in the motor. The vibration and noise lowers reliability with respect to performance of the robot and gives a shock to mechanical components including a motor, thereby shortening the lifetime of the robot. The vibration and noise is conspicuously severe in a large-scale mechanical apparatus such as an industrial robot which is greatly influenced by the inertia and gravity.

SUMMARY OF THE INVENTION

To solve the above problems, it is an object of the present invention to provide a motor speed controlling method capable of performing a real-time control, in which a speed command profile and an acceleration profile have a continuous value of a smooth curve, respectively, and the time taken when a changed speed reaches an actual operational speed of a motor is reduced.

To accomplish the above object of the present invention, there is provided a motor speed controlling method for use in a motor speed controlling apparatus including a motor for driving a robot, a position controller for controlling the motor, and a main controller for producing a speed command profile of a smooth curve for controlling the motor based on a robot operational command input by a user and transmitting the produced speed command profile to the position controller, the motor speed controlling method comprising the step of producing a speed command profile having an acceleration profile of a smooth curve within a predetermined robot control interval so that a robot can be controlled on a real-time basis.

Preferably, the speed command profile producing step comprises an operational control preparation step for obtaining a position change amount $\Delta P$, the maximum number of intervals $TP_{max}$, and the number of acceleration intervals $TA_{max}$ according to the following expressions:

Formula 1

$$\Delta P = P_g - P_c;$$

$$TP_{max} = \frac{\Delta P}{V_m}; \text{ and}$$

$$TA_{max} = A_p$$

wherein $P_g$ is a target position, $P_c$ is a current position, $V_m$ is a maximum speed per unit time and $A_p$ is an acceleration interval and is a value set by the user robot operational command.

It is preferable that the operational control preparation step comprises the step of obtaining the maximum number of intervals $TP_{max}$, and the number of acceleration intervals $TA_{max}$ according to the following expressions:

Formula 2

$$x = TP_{max} \times TA_{max};$$

$$TA_{max} = \sqrt{x}; \text{ and}$$

$$TP_{max} = \frac{x}{TA_{max}}$$

where the maximum number of intervals $TP_{max}$ is smaller than the number of acceleration intervals $TA_{max}$.

It is also preferable that the operational control preparation step comprises the step of obtaining a position change amount $\Delta P_1$ of one interval according to the following expression, using the obtained position change amount $\Delta P$, the obtained maximum number of intervals $TP_{max}$, and the obtained number of acceleration intervals $TA_{max}$, and setting initial values of an initial speed $S_i$, a maximum speed $S_m$ and a final speed $S_f$ into 0, 1 and 0, respectively:

Formula 3

$$\Delta P_1 = \frac{\Delta P}{TP_{max}}.$$

Meanwhile, the speed command profile producing step comprises the step of setting an initial value, $TP_c$, of an interval counter which increases by one(1) whenever the speed command profile is produced, to zero, and obtaining values ($Aa_0, Aa_1, Aa_2$) for calculating a current speed during acceleration, values ($Da_0, Da_1$) for calculating a current speed during deceleration, the number of acceleration intervals $T_{acc}$, the number of deceleration intervals $T_{dec}$, and the number of acceleration and constant speed intervals $TP_i$, in order to obtain values of variables necessary for production of the speed command profile, according to the following expressions:

Formula 4

$$T_{acc} = TA_{\max} \times |S_m - S_i|;$$

$$T_{dec} = TA_{\max} \times |S_m - S_f|;$$

$$TP_i = TP_{\max} - \left( T_{acc} \times S_i + \frac{(S_m - S_f) \times T_{acc}}{2} + \frac{(S_m - S_f) \times T_{dec}}{2} \right);$$

Formula 5

$$Aa_0 = S_i;$$

$$Aa_1 = \frac{3}{T_{acc} \times T_{acc}} \times (S_m - S_i);$$

$$Aa_2 = \frac{-2}{T_{acc} \times T_{acc} \times T_{acc}} \times (S_m - S_i);$$

$$Da_0 = \frac{3}{T_{dec} \times T_{dec}} \times (S_m - S_f); \text{ and}$$

$$Da_1 = \frac{-2}{T_{dec} \times T_{dec} \times T_{dec}} \times (S_m - S_f).$$

It is preferable that when a value of the expression $$\left| \left\{ T_{acc} \times S_i + \frac{(S_m - S_i) \times T_{acc}}{2} + (S_m - S_f) \times T_{dec} \right\} \right|$$

is larger than a predetermined constant, the number of constant speed intervals $TP_i$ and the maximum speed $S_m$ are obtained by the following expressions:

Formula 6

$$TP_i = TP_i + \frac{T_{acc} \times S_i + \frac{(S_m - S_i) \times T_{acc}}{2} + \frac{(S_m - S_f) \times T_{dec}}{2} - S_m}{\text{VELCOPENSATION}};$$

and $$S_m = \frac{(TP_{\max} - S_i \times T_{acc})}{T_{acc} + T_{dec} + TP_i \times 2}.$$

Also, under the above conditions, the current speed value $V_c$ is calculated to produce a speed command profile, and the obtained current speed $V_c$ and the current position $P_c$ are added to update the current position $P_c$:

① where $TP_c < T_{acc}$
Formula 7

$$V_c = \Delta P_1 \times (Aa_0 + Aa_1 \times TP_c \times TP_c + Aa_2 \times TP_c \times TP_c \times TP_c);$$

② where $TP_c < TP_i$
Formula 8

$$V_c = \Delta P_1 (Da_0 \times TP_c \times TP_c + Da_1 \times TP_c \times TP_c \times TP_c); \text{ and}$$

③ in the remaining cases
Formula 9

$$V_c = \Delta P_1 \times S_m.$$

BRIEF DESCRIPTION OF THE DRAWINGS

The object and other advantages of the present invention will become more apparent by describing in detail the structures and operations of the present invention with reference to the accompanying drawings, in which:

FIGS. 1a and 1a' show user command paths according to the conventional art;

FIGS. 1b and 1b' show speed command profiles with respect to FIGS. 1a and 1a', respectively;

FIGS. 1c and 1c' show an acceleration profile with respect to FIGS. 1a and 1a', respectively;

DETAILED DESCRIPTION OF THE INVENTION

A preferred embodiment of the present invention will be described in detail with reference to the accompanying drawings.

Figure 2:
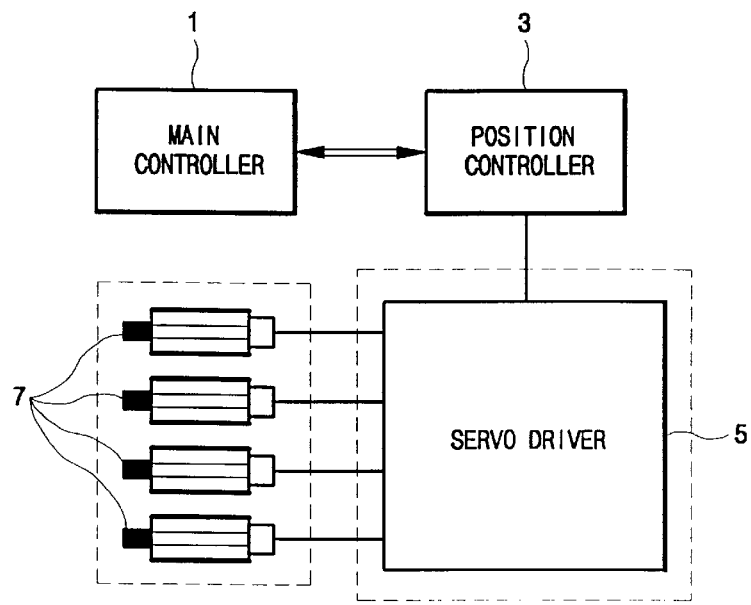
FIG. 2 is a schematic block diagram of a robot according to a preferred embodiment of the present invention.

Referring to FIG. 2, a robot according to the present invention includes a main controller 1, a position controller 3 for controlling a servo driver 5 and at the same time feedback-controlling the position of the robot, based on the speed command profile supplied from the main controller 1. The servo driver 5 receives a command from the position controller 3 to drive a servo motor 7, and the servo motor 7 mounted in the robot drives the robot actually.

Figure 3:
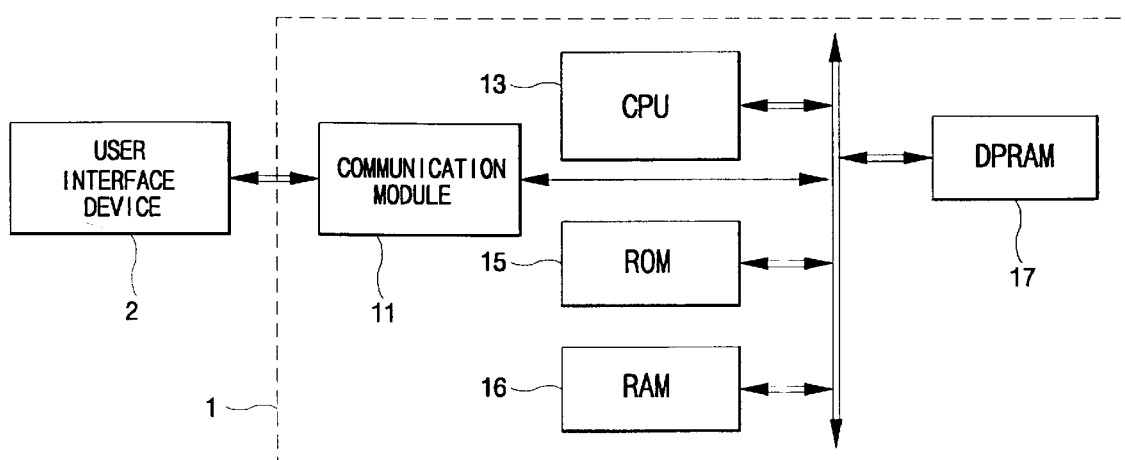
FIG. 3 is a schematic block diagram of a main controller according to a preferred embodiment of the present invention.

Referring to FIG. 3, the main controller 1 includes a communications module 11 for communication with a user interface unit 2 by which an operational command for the robot can be programmed by a user, a central processing unit (CPU) 13 for producing a speed command profile, a read only memory (ROM) 15 for storing a robot system control program as an execution code, a random access memory (RAM) 16 for storing the user command program and variable information necessary for operation of speed and acceleration profiles in the CPU 13, and a dual port RAM (DPRAM) 17 for communication with the position controller 3 with respect to speed command and position information.

By the above configuration, if an electric power is supplied to the robot, a control execution code stored in the ROM 15 operates and data necessary for execution of the control execution code is recorded in the RAM 16. If a user inputs a command program by use of the user interface unit 2, the CPU 13 produces a speed command profile and an acceleration profile based thereon.

Figure 4:
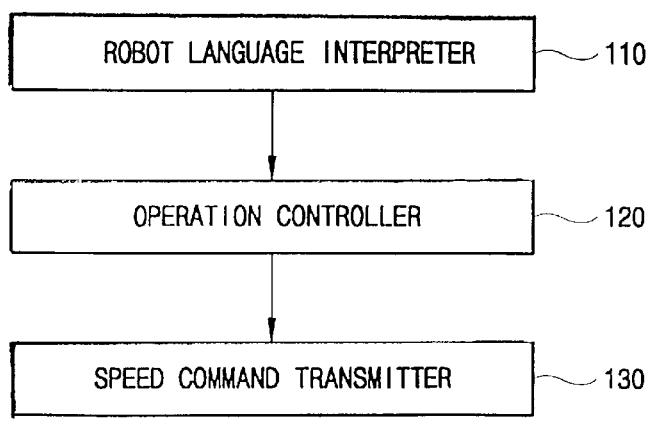
FIG. 4 is a software block diagram for producing a speed command profile and an acceleration profile.
Figure 5:
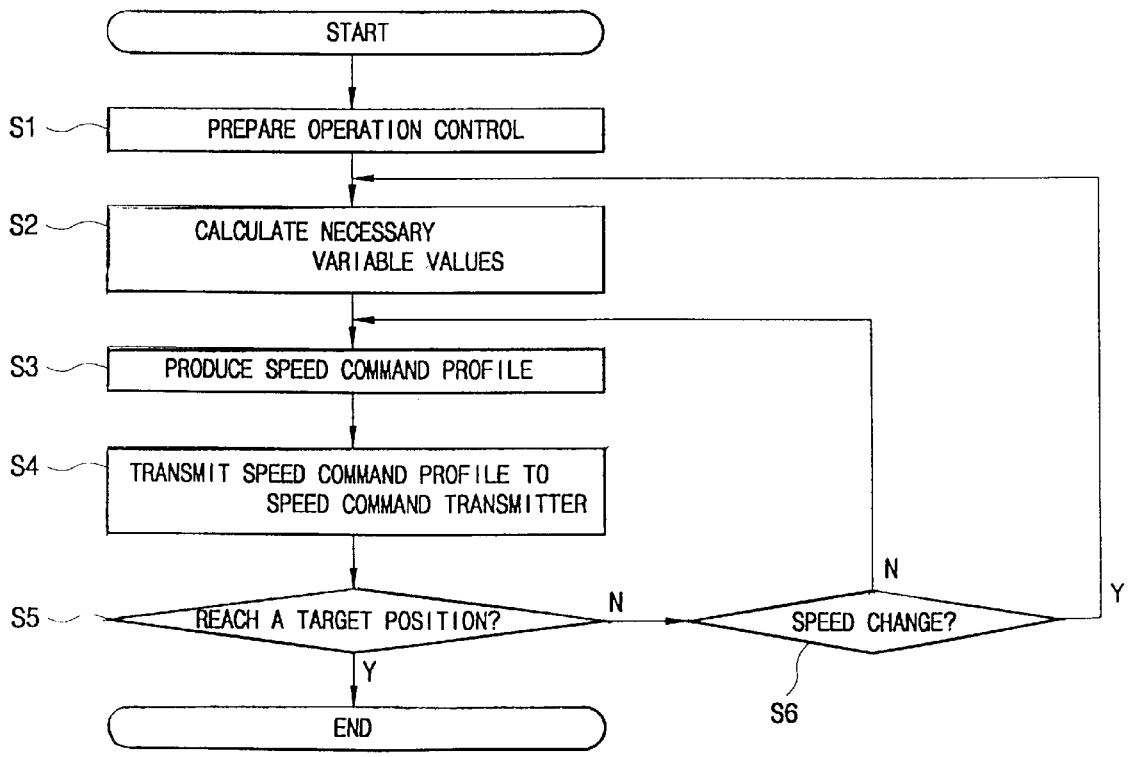
FIG. 5 is a flowchart view for producing a speed command profile and an acceleration profile in an operational controller.

FIG. 4 is a software block diagram for producing a speed command profile and an acceleration profile which is performed in the main controller 1. FIG. 5 is a flowchart view for producing a speed command profile and an acceleration profile in an operational controller 140 of FIG. 4.

Hereinafter, a process for producing a speed command profile by the main controller 1 according to the present invention will be described in detail with reference to the accompanying drawings.

If a user command program made up into a predetermined robot language is input to the main controller 1 via the user interface unit 2, a robot language interpreter 110 interprets the meaning thereof. In the case that the interpreted command is an operational command, the robot language interpreter 110 sends the interpreted command to an operation controller 120. The operation controller 120, which receives an operation instruction and a target position $P_g$, performs the operations to be described below, by use of the target position $P_g$ and a value of other user-set variables, to thereby prepare an operation control (S1). That is, in the operation control preparation step (S1), a position change amount $\Delta P$, corresponding to a difference value between a current position $P_c$ and a target position $P_g$, the maximum number of intervals $TP_{max}$, and the number of acceleration intervals $TA_{max}$ are given by the following expressions:

Formula 1

$$\Delta P = P_g - P_c;$$
$$TP_{max} = \frac{\Delta P}{V_m}; \text{ and}$$
$$TA_{max} = A_p$$

wherein $P_g$ is a target position, $P_c$ is a current position, $V_m$ is a maximum speed per unit time and $A_p$ is an acceleration interval and is a value set by the user robot operational command.

Here, since it is not logical if the maximum number of intervals $TP_{max}$ is smaller than the number of acceleration intervals $TA_{max}$, the maximum number of intervals $TP_{max}$ and the number of acceleration intervals $TA_{max}$ are obtained again using the following expressions:

Formula 2

$$x = TP_{max} \times TA_{max};$$
$$TA_{max} = \sqrt{x}; \text{ and}$$
$$TP_{max} = \frac{x}{TA_{max}}.$$

Using the obtained position change amount $\Delta P_1$, the obtained maximum number of intervals $TP_{max}$, and the obtained number of acceleration intervals $TA_{max}$, a position change amount $\Delta P_1$ of one interval is obtained according to the following expression:

Formula 3

$$\Delta P_1 = \frac{\Delta P}{TP_{max}}.$$

Initial values of an initial speed $S_i$, a maximum speed $S_m$ and a final speed $S_f$ are set into 0, 1 and 0, respectively:

As described above, if the position change amount $\Delta P$, the maximum number of intervals $TP_{max}$, the number of acceleration intervals $TA_{max}$, and the position change amount $\Delta P_1$ of one interval are obtained and then the initial speed $S_i$, the maximum speed $S_m$ and the final speed $S_f$ are set, the operation control preparation step S1 is completed.

However, in the case that the position change amount $\Delta P$ obtained in the operation control preparation step S1 is smaller than a minimum position movement amount MINPOSITION which is a constant value set in the robot system control program stored in the ROM 15, it is judged that the robot has been already positioned at a target position and then the operation control is completed.

If the operation control preparation is completed, the operation controller 120 obtains a variable value necessary for producing a speed command profile (S2). In this step S2, values ($Aa_0, Aa_1, Aa_2$) for calculating a current speed during acceleration, values ($Da_0, Da_1$) for calculating a current speed during deceleration, the number of acceleration intervals $T_{acc}$, the number of deceleration intervals $T_{dec}$, and the number of acceleration and constant speed intervals $TP_i$ are obtained.

First, the number of acceleration intervals $T_{acc}$ and the number of deceleration intervals $T_{dec}$ are first obtained, and then the number of acceleration and constant speed intervals $TP_i$ is obtained, according to the following expressions:

Formula 4

$$T_{acc} = TA_{max} \times |S_m - S_i|; \text{ and}$$
$$T_{dec} = TA_{max} \times |S_m - S_f|.$$
$$TP_i = TP_{max} - \left(T_{acc} \times S_i + \frac{(S_m - S_f) \times T_{acc}}{2} + \frac{(S_m - S_f) \times T_{dec}}{2}\right).$$

Here, when a value resulting from the expression $$\left|\left\{T_{acc} \times S_i + \frac{(S_m - S_i) \times T_{acc}}{2} + (S_m - S_f) \times T_{dec}\right\}\right|$$

is larger than a speed correction reference value VELCOMPENSATION which is a predetermined constant value set in the root system control program stored in the ROM 15, it is beyond the reliable control range set by the robot user. Thus, the numbers0 of constant speed intervals $TP_i$ and the maximum speed $S_m$ are obtained again by the following expressions:

Formula 6

$$TP_i = $$
$$TP_i + \frac{T_{acc} \times S_i + \frac{(S_m - S_i) \times T_{acc}}{2} + \frac{(S_m - S_f) \times T_{dec}}{2} - S_m}{\text{VELCOPENSATION}};$$

and

-continued
$$S_m = \frac{(TP_{max} - S_i \times T_{acc})}{T_{acc} + T_{dec} + TP_i \times 2}.$$

Then, the $Aa_0$, $Aa_1$, $Aa_2$, $Da_0$, and $Da_1$ are obtained by using the following expressions:

Formula 5

$$Aa_0 = S_i;$$

$$Aa_1 = \frac{3}{T_{acc} \times T_{acc}} \times (S_m - S_i);$$

$$Aa_2 = \frac{-2}{T_{acc} \times T_{acc} \times T_{acc}} \times (S_m - S_i);$$

$$Da_0 = \frac{3}{T_{dec} \times T_{dec}} \times (S_m - S_f); \text{ and}$$

$$Da_1 = \frac{-2}{T_{dec} \times T_{dec} \times T_{dec}} \times (S_m - S_f).$$

Meanwhile, $TP_c$ is an interval counter and an initial value is set as zero, which increases by one whenever a speed command profile is produced.

The next step S3 is a step for producing a speed command profile with the calculation results. Also, the current speed value $V_c$ is calculated to produce a speed command profile, in which case the current speed value $V_c$ is selectively calculated under the following conditions:

① where $TP_c < T_{acc}$
Formula 7

$$V_c = \Delta P_1 \times (Aa_0 + Aa_1 \times TP_c \times TP_c + Aa_2 \times TP_c \times TP_c \times TP_c);$$

② where $TP_c < TP_i$
Formula 8

$$V_c = \Delta P_1 \times (Da_0 \times TP_c \times TP_c + Da_1 \times TP_c \times TP_c \times TP_c); \text{ and}$$

③ in the remaining cases
Formula 9

$$V_c = \Delta P_1 \times S_m.$$

Since the obtained current speed $V_c$ means a current movement distance per unit time, the current speed $V_c$ is added to the current position $P_c$ to update the current position $P_c$.

Then, a speed command transmitter 130 stores the $P_c$ value in the DPROM 17 and then informs the position controller 3 that the current position has been updated (S4).

Also, the operation controller 120 compares the position change amount $\Delta P$ between the first input target position $P_g$ and the updated current position $P_c$ with the minimum position movement amount MINPOSITION. If the position change amount is smaller than the minimum position movement amount, the controller 120 judges that the current is the target position (S5), to then complete the operation control. However, if the position change amount is equal to or larger than the minimum position movement amount, the controller 120 judge that the current position is not the target position (S5), and then, checks whether a user command speed S has been altered (S6).

If it is judged that the user command speed S has not been altered in step S6, the program returns to the speed command profile production step S3 to reach the target position. If it is judged that the user command speed S has been altered in step S6, a variable value necessary for production of a speed command profile is obtained again in step S2.

Then, based on the newly obtained speed command profile, a speed command profile is produced again (S3).

Figure 6A:
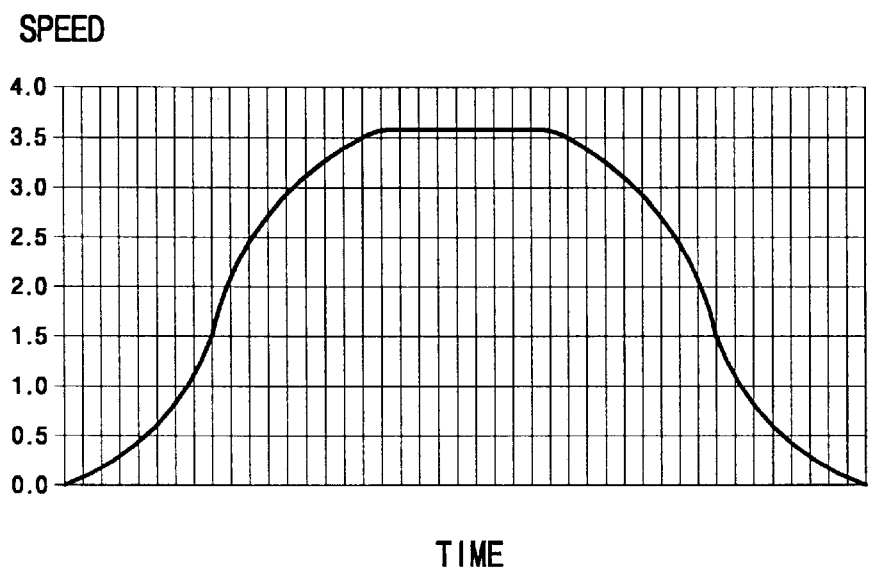
FIGS. 6a and 6b are graphical views showing a speed command profile and an acceleration profile in a constant speed interval according to the present invention, respectively.
Figure 6B:
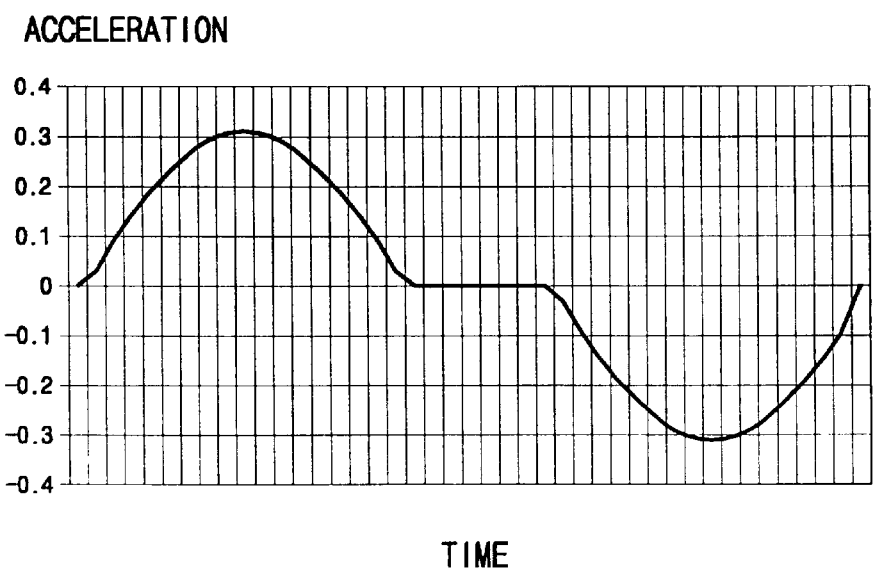
Figure 7A:
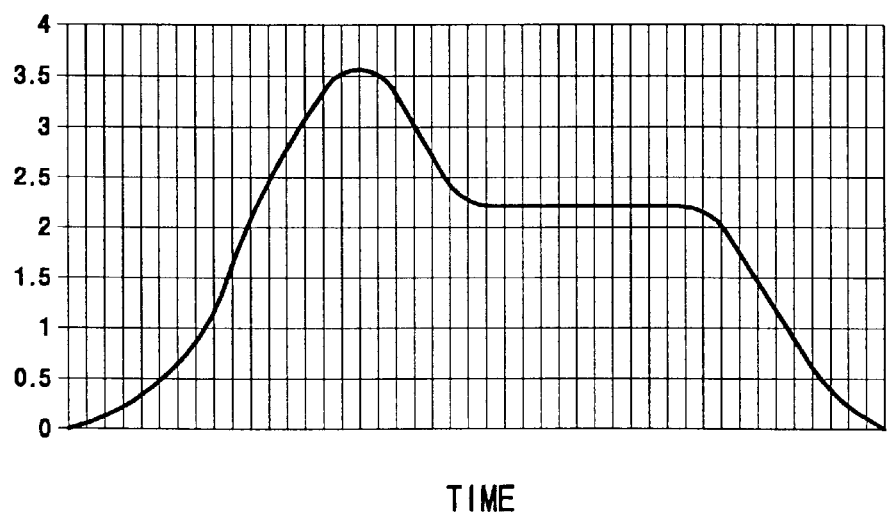
FIGS. 7a and 7b are graphical views respectively showing a speed command profile and an acceleration profile in the case that the speed in a constant speed interval is changed into a 60% speed.
Figure 7B:
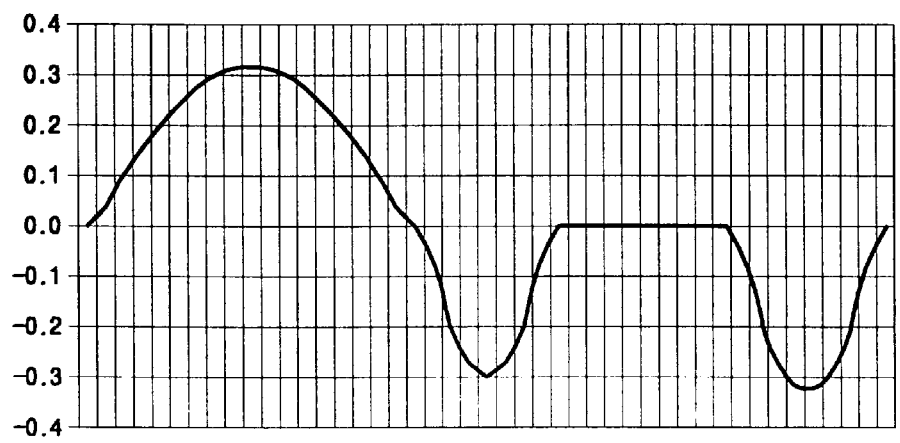
Figure 8A:
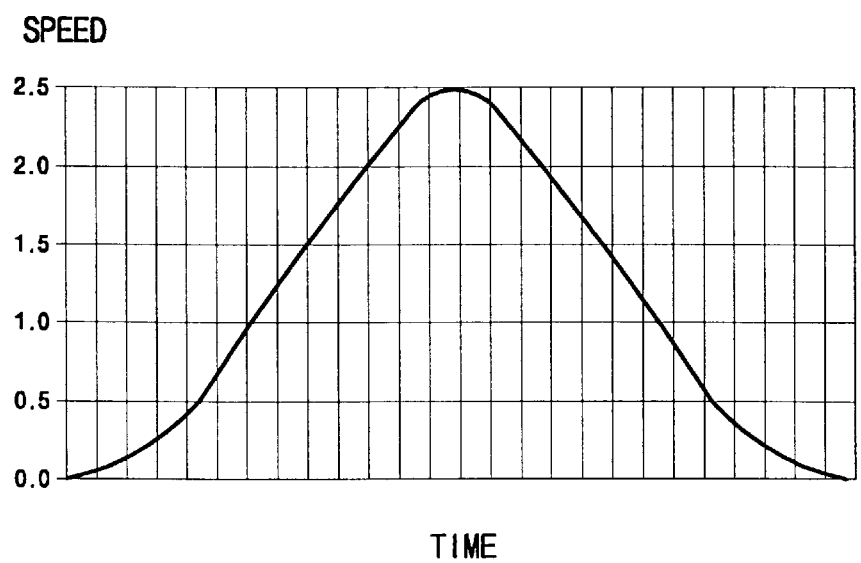
FIGS. 8a and 8b are graphical views respectively showing a speed command profile and an acceleration profile in the interval where the constant speed interval is not included therein.
Figure 8B:
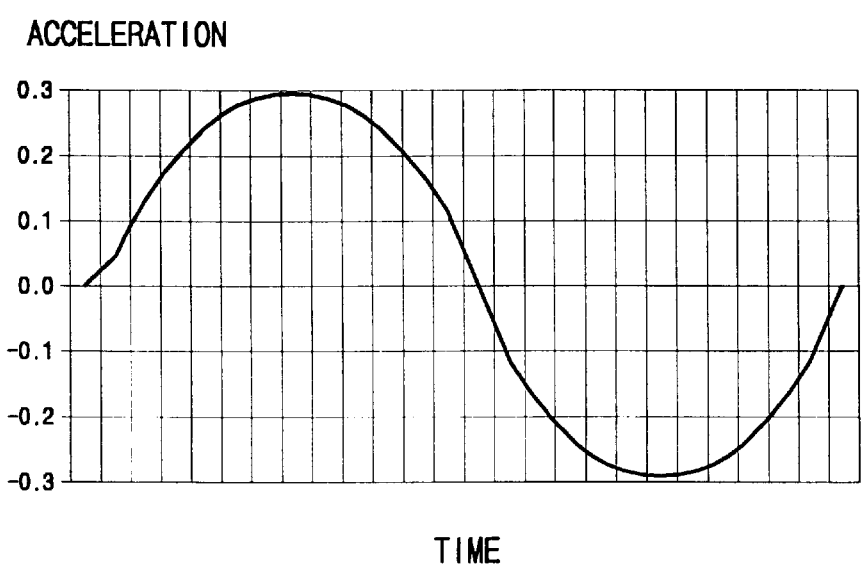
Figure 9A:
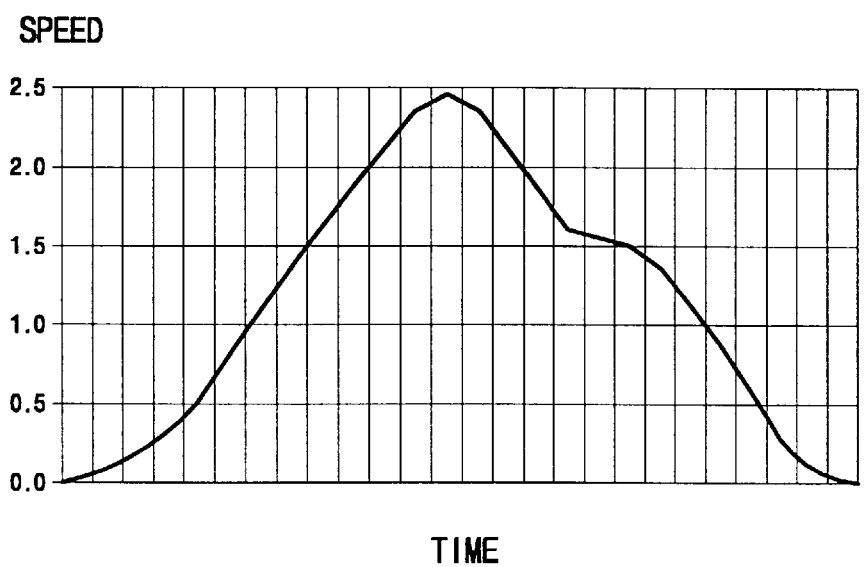
FIGS. 9a and 9b are graphical views respectively showing a speed command profile and an acceleration profile when the speed is changed into a 60% speed in the interval where a constant speed interval is not included therein.
Figure 9B:
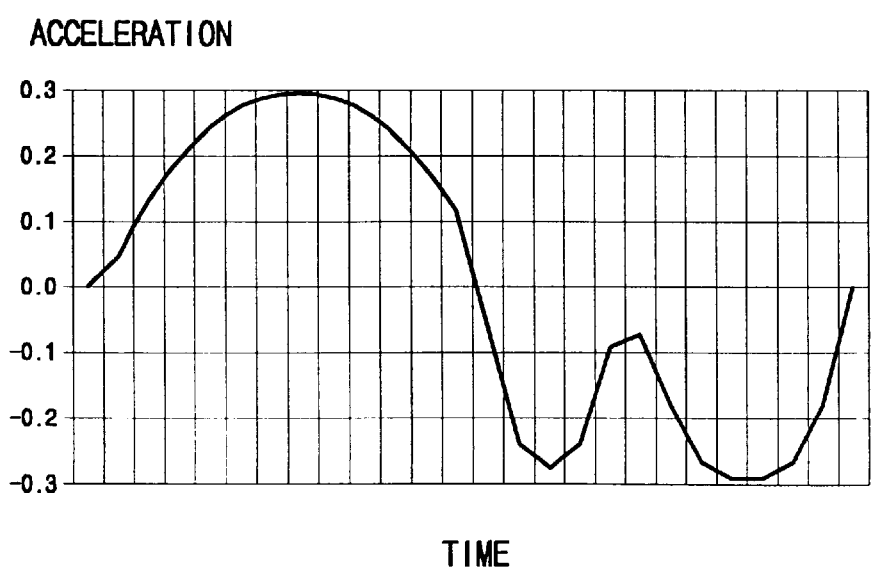

The operation controller 120 completes the operation control if it is judged to reach the target position through the above procedures, FIGS. 6a through 9b show a speed command profile and an acceleration profile which are obtained through the above procedures. In more detail, FIGS. 6a and 6b are graphical views respectively showing a speed command profile and an acceleration profile in a constant speed interval according to the present invention. FIGS. 7a and 7b are graphical views respectively showing a speed command profile and an acceleration profile in the case that the speed in a constant speed interval is changed into a 60% speed. FIGS. 8a and 8b are graphical views respectively showing a speed command profile and an acceleration profile in the interval where the constant speed interval is not included therein. FIGS. 9a and 9b are graphical views respectively showing a speed command profile and an acceleration profile, when the speed is changed into a 60% speed in the interval where a constant speed interval is included therein.

As illustrated in FIGS. 6a through 9b, even in the case that a speed change has occurred in a constant speed interval, the speed command profile and the acceleration profile have a continuous change amount of a smooth curve, respectively. Thus, it can be seen from the accompanying drawings that there are no points of sharp change in acceleration speed as well as in speed.

As described above, the present invention provides a motor speed controling method having a continuous change amount in a speed command profile and an acceleration profile, to accordingly reduce vibration and noise and improve a control reliability.

In addition, the conventional motor speed controlling method adopts two steps of producing a path plan of a target value based on a user driving command and then producing a speed command profile. The motor speed controlling method can immediately produce a speed command profile according to a target value. Thus, although a user speed command is altered during production of a speed command profile, the speed command profile can be produced immediately. Accordingly, a response to the speed change is very fast enough to enabling the robot to be controlled on a real-time basis.

Although the present invention has been described in connection with preferred embodiment thereof, it will be appreciated by those skilled in the art that additions, modifications, substitutions and deletions not specifically described may be made without departing from the spirit and scope of the invention as defined in the appended claims.

What is claimed is:

1. A motor speed controlling method for use in a motor speed controlling apparatus including a motor for driving a robot, a position controller for controlling the motor, and a main controller for producing a speed command profile of a smooth curve to control the motor based on a robot operational command input by a user and transmit the produced speed command profile to the position controller, the motor speed controlling method comprising the step of:

producing a speed command profile having an acceleration profile of a smooth curve within a predetermined robot control interval so that a robot can be controlled on a real-time basis, said speed command profile producing step comprising an operational preparation step for obtaining a position change amount $\Delta P$, the maximum number of intervals $TP_{max}$, and the number of acceleration intervals $TA_{max}$ according to the following expressions:

Formula 1

$$\Delta P = P_g - P_c;$$

$$TP_{max} = \frac{\Delta P}{V_m}; \text{ and}$$

$$TA_{max} = A_p.$$

wherein $P_g$ is a target position, $P_c$ is a current position, $V_m$ is a maximum speed per unit time and $A_p$ is an acceleration interval and is a value set by the user robot operational command.

2. The motor speed controlling method according to claim 1, wherein said operational control preparation step comprises the step of obtaining the maximum number of intervals $TP_{max}$, and the number of acceleration intervals $TA_{max}$ according to the following expressions:

Formula 2

$$x = TP_{max} \times TA_{max};$$

$$TA_{max} = \sqrt{x}; \text{ and}$$

$$TP_{max} = \frac{x}{TA_{max}}$$

where the maximum number of intervals $TP_{max}$ is smaller than the number of acceleration intervals $TA_{max}$.

3. The motor speed controlling method according to claim 1, wherein said operational control preparation step comprises the steps of obtaining a position change amount $\Delta P_1$ of one interval according to the following expression, using the obtained position change amount $\Delta P$, the obtained maximum number of intervals $TP_{max}$, and the obtained number of acceleration intervals $TA_{max}$ and setting initial values of an initial speed $S_i$, a maximum speed $S_m$ and a final speed $S_f$ into 0, 1 and 0, respectively:

Formula 3

$$\Delta P_1 = \frac{\Delta P}{TP_{max}}.$$

4. The motor speed controlling method according to claim 3, wherein said speed command profile producing step comprises the step of setting an initial value, $TP_c$, of an interval counter which increases by one whenever the speed command profile is produced, to zero, and obtaining values ($Aa_0$, $Aa_1$, $Aa_2$) for calculating a current speed during acceleration, values ($Da_0$, $Da_1$) for calculating a current speed during deceleration, the number of acceleration intervals $T_{acc}$, the number of deceleration intervals $T_{dec}$, and the number of acceleration and constant speed intervals $TP_i$, in order to obtain values of variables necessary for production of the speed command profile, according to the following expressions:

Formula 4

$$T_{acc} = TA_{max} \times |S_m - S_i|; \text{ and}$$

$$T_{dec} = TA_{max} \times |S_m - S_f|.$$

-continued $$TP_i = TP_{max} - \left( T_{acc} \times S_i + \frac{(S_m - S_f) \times T_{acc}}{2} + \frac{(S_m - S_f) \times T_{dec}}{2} \right).$$

$$Aa_0 = S_i;$$

$$Aa_1 = \frac{3}{T_{acc} \times T_{acc}} \times (S_m - S_i);$$

$$Aa_2 = \frac{-2}{T_{acc} \times T_{acc} \times T_{acc}} \times (S_m - S_i);$$

$$Da_0 = \frac{3}{T_{dec} \times T_{dec}} \times (S_m - S_f); \text{ and}$$

$$Da_1 = \frac{-2}{T_{dec} \times T_{dec} \times T_{dec}} \times (S_m - S_f).$$

5. The motor speed controlling method according to claim 4, wherein when a value resulting from the $$\left| \left\{ T_{acc} \times S_i + \frac{(S_m - S_i) \times T_{acc}}{2} + (S_m - S_f) \times T_{dec} \right\} \right|$$

is larger than a predetermined constant, the number of constant speed intervals $TP_i$ and the maximum speed $S_m$ are obtained by the following expressions:

Formula 6

$$TP_i =$$

$$TP_i + \frac{T_{acc} \times S_i + \frac{(S_m - S_i) \times T_{acc}}{2} + \frac{(S_m - S_f) \times T_{dec}}{2} - S_m}{\text{VELCOPENSATION}};$$

and $$S_m = \frac{(TP_{max} - S_i \times T_{acc})}{T_{acc} + T_{dec} + TP_i \times 2}.$$

6. The motor speed controlling method according to claim 5, wherein the current speed value $V_c$ is calculated to produce a speed command profile, and the obtained current speed $V_c$ and the current position $P_c$ are added to update the current position $P_c$ under the following conditions:

① where $TP_c < T_{acc}$

Formula 7

$$V_c = \Delta P_1 \times (Aa_0 + Aa_1 \times TP_c \times TP_c + Aa_2 \times TP_c \times TP_c \times TP_c);$$

② where $TP_c < TP_i$

Formula 8

$$V_c = \Delta P_1 \times (Da_0 \times TP_c \times TP_c + Da_1 \times TP_c \times TP_c \times TP_c); \text{ and}$$

③ in the remaining cases

Formula 9

$$V_c = \Delta P_1 \times S_m.$$

* * * * *